United States Patent [19]
Hickman et al.

[11] 4,304,682
[45] Dec. 8, 1981

[54] DIOL COMPOSITIONS

[75] Inventors: Howard M. Hickman, Worthington; Gary W. Earl, Bexley, both of Ohio

[73] Assignee: Sherex Chemical Company, Inc., Dublin, Ohio

[21] Appl. No.: 9,998

[22] Filed: Feb. 7, 1979

[51] Int. Cl.$^3$ .................... C09K 3/00; H05B 33/00
[52] U.S. Cl. .................... 252/182; 568/580; 560/85; 560/194
[58] Field of Search ............ 560/85, 194; 568/580; 252/182

[56] References Cited

U.S. PATENT DOCUMENTS 4,128,532 12/1978 Eimers et al. ............ 560/85 X

Primary Examiner—Bernard Helfin
Attorney, Agent, or Firm—Edward B. Dunning; Burton A. Amernick

[57] ABSTRACT

A polyol composition consisting essentially of a homogenous liquid admixture of propylene glycol and a diol obtained by alkoxylating a propylene glycol dispersion of 3,3',5,5'-tetrabromobisphenol A with ethylene oxide, propylene oxide or mixtures thereof. These polyol compositions are useful in preparing fire and chemical resistant thermosetting resinous compositions.

8 Claims, No Drawings

DIOL COMPOSITIONS

BACKGROUND OF THE INVENTION

1. Field of the Invention

This invention relates to diol compositions.

2. Description of the Prior Art

Thermosetting polyester resinous compositions comprising solutions of an essentially linear unsaturated polyester in a vinyl monomeric crosslinking agent, e.g., styrene, are extensively utilized to prepare molded or cast thermoset plastic articles. The indicated linear polyesters are obtained by condensing an $\alpha,\beta$-ethylenically unsaturated dicarboxylic acid as all or part of the diacid component with a glycol. The bulk of the glycols used for this purpose is propylene glycol.

Where it is desired to impart fire and chemical resistance to the polyester, a halogentated diacid and/or a halogenated diol is generally incorporated into the polyester structure for optimum results. A particularly preferred halogenated compound useful for this purpose is the diol obtained by alkoxylating 3,3',5,5'-tetrabromobisphenol A. In accordance with the prior art, the alkoxylation reaction is carried out in an inert solvent which is removed upon completion of the reaction to provide the compound as a high melting solid which is sold as a powder or solid melt. Removal of the solvent in this manner is costly and moreover provides a product which is difficult to handle in connection with its use to prepare linear polyester resins.

SUMMARY OF THE INVENTION

In accordance with this invention, diol compositions are provided by reacting a propylene glycol dispersion of 3,3',5,5'-tetrabromobisphenol A with at least a stoichiometrical amount based on said phenolic compound of ethylene oxide, propylene oxide or mixtures thereof. Conventional alkoxylation reaction conditions apply resulting in essentially complete preferential addition of the alkylene oxide to the phenolic hydroxy groups present. Following the completion of the adduction reaction, the resultant homogeneous liquid diol admixture is stabilized by co-reaction with an adjuvant amount of maleic anhydride thereby providing a liquid composition having indefinite storage stability at a moderately elevated temperature in the order of about 50° C.

DESCRIPTION OF THE PREFERRED EMBODIMENT

Bisphenol A, the starting material in the practice of this invention, is a commodity chemical prepared by condensing phenol with acetone. The 3,3', 5,5'-tetrabromobisphenol A derivative is likewise commercially available and a representative product will be identified in the working example to follow. The indicated bromo derivative is dispersible in propylene glycol and, accordingly in preparing the diol compositions of this invention, the tetrabromobisphenol A is first dispersed in said glycol prior to effecting the alkoxylation thereof. Applicable dispersions of this type are composed of said glycol and the brominated bishpenol A in the weight ratio of from 8:92::20:80, respectively. The preferred ratio for the utilitarian purposes contemplated herein is about 15:85, respectively.

The glycol dispersion of the tetrabromobisphenol A is reacted with the alkylene oxide under conditions normally observed in an adduction reaction of this type. These conditions include a temperature of from about 100° C. to 150° C. Pressure conditions are in the order of from about 3 to 6 atmosphere corresponding to the autogenous pressures developed when observing a reaction temperature with the aforesaid range. Conventionally, a basic catalyst is employed to facilitate the reaction. Strong bases such as the alkali metal hydroxides, sodium methylate and the like are particularly suitable.

As previously indicated, the contemplatd alkylene oxides useful in the practice of this invention are propylene oxide and ethylene oxide. Mixtures of these oxides are likewise applicable. The preferred ratio of the alkylene oxide to the tetrabromobisphenol A is about stoichiometrical; i.e., 2–2.2 moles of the alkylene oxide per mole of said phenol. Higher ratios of alkylene oxide can be employed. However, when the stoichiometrical amount is substantially exceeded there is the likelihood of producing a diol which may not be considered as the most desirable in preparing linear polyesters of optimum rigidity, chemical and/or fire resistance.

The end point of the alkoxylation reaction can be conveniently determined by noting when the reaction pressure completely subsides. In the situation where a stoichiometrical amount of the alkylene oxide is observed, the completion of reaction is indicated by a nil acid value upon completion of the reaction. Following completion of the adduction reaction, the resultant clear liquid solution is reacted with an adjuvant amount of maleic or phthalic anhydride. Typically, from 10–20 minutes at 100°–150° C. serves to effect substantially complete chemical assimilation of the anhydride. Optimum amount of the anhydride, specifically maleic anhydride, is in the order of about 0.2 per mole of the brominated bisphenol A adduct. Amounts up to 0.5 mol of the anhydride are effective but have been found to offer no particular advantage.

The stabilized diol composition will remain a clear liquid for an indefinite period of storage provided the storage temperature is moderately in excess of ambient such as about 50° C. Most storage facilities encountered in the manufacture of polyester resinous compositions, as well as heated transport carriers, are adapted to maintain such conditions.

For the purpose of illustrating the best mode contemplated for practicing the present invention, the following working example is given. All parts and percentages set forth are parts by weight unless otherwise indicated.

EXAMPLE I

Into a suitable pressure reaction vessel were charged 546 parts of tetrabromobisphenol A (AB-50; Great Lakes Chemical Corp.), 276 parts propylene glycol and 7.3 parts of alcoholic potassium hydroxide containing 25% active. Ethylene oxide in the amount of 97 parts were added at 105–118° C., providing a pressure of about six atmospheres maximum. The ethylene oxide was allowed to react at the temperature conditions noted until there was no detectable acid value whereupon the product exhibited a hydroxyl value of 540. To aliquot portions of the product were respectively added 0.2, 0.3, 0.4 and 0.5 mol of maleic anhydride based on the tetrabromobisphenol A adduct present and held with stirring for 15 minutes. Test samples of the foregoing stabilized products were stored in an oven maintained at 50° C. After 60 days storage, all samples remained clear and evidenced no perceptible amount of precipitate.

What is claimed is:

1. A diol-containing composition capable of remaining as a substantially clear liquid for an extended period of storage at a temperature moderately in excess of ambient, said composition prepared by subjecting to an adduction reaction, a mixture of propylene glycol and 3,3',5,5'-tetrabromobisphenol A wherein the weight ratio of said propylene glycol and said 3,3',5,5'-tetrabromobisphenol A is from about 3:92 to 1:2, respectively, with ethylene oxide or propylene oxide or mixtures thereof in an amount of 2–2.2 moles of the oxide per mole of the 3,3'5,5'-tetrabromobisphenol A; and reacting the resultant solution of diols obtained thereby with from about 0.2–0.5 mole of maleic anhydride or phthalic anhydride per mole of the 3,3',5,5'-tetrabromobisphenol A-alkylene oxide adduct.

2. The diol composition in accordance with claim 1 wherein the weight ratio of said glycol to said tetrabromobisphenol A is about 15:85, respectively.

3. A diol composition in accordance with either of claim 2 or claim 1 wherein said oxide is ethylene oxide.

4. A diol composition in accordance with either of claim 2 or claim 1 wherein said oxide is propylene oxide.

5. The composition of claim 1 wherein said adduction reaction is carried out under autogenous pressure.

6. The composition of either claim 1 or claim 5 wherein said adduction reaction is carried out at temperatures of about 100° to 150° C.

7. The composition of claim 6 wherein said adduction is carried out at pressures of from about 3 to 6 atmospheres.

8. The composition of claim 1 wherein said adduction reaction is carried out in the presence of a basic catalyst.

* * * * *